US012620377B2

(12) United States Patent
Dolan et al.

(10) Patent No.: US 12,620,377 B2
(45) Date of Patent: May 5, 2026

(54) WIRELESS MIDI HEADSET

(71) Applicant: QRS MUSIC TECHNOLOGIES, INC., Seneca, PA (US)

(72) Inventors: Thomas A. Dolan, Hendersonville, TN (US); Robert Shirey, Seneca, PA (US); Jarrod Cook, Seneca, PA (US); Aaron Yost, Seneca, PA (US)

(73) Assignee: QRS MUSIC TECHNOLOGIES, INC., Seneca, PA (US)

(*) Notice: Subject to any disclaimer, the term of this patent is extended or adjusted under 35 U.S.C. 154(b) by 689 days.

(21) Appl. No.: 17/077,553

(22) Filed: Oct. 22, 2020

(65) Prior Publication Data

US 2021/0125594 A1 Apr. 29, 2021

Related U.S. Application Data

(60) Provisional application No. 62/924,872, filed on Oct. 23, 2019.

(51) Int. Cl.
*G10H 1/00* (2006.01)

(52) U.S. Cl.
CPC ..... *G10H 1/0066* (2013.01); *G10H 2240/311* (2013.01); *G10H 2240/321* (2013.01)

(58) Field of Classification Search
CPC ........... G10H 1/0066; G10H 2240/311; G10H 2240/321; G10H 1/0083; G10H 1/00;
(Continued)

(56) References Cited

U.S. PATENT DOCUMENTS

| | | | | |
|---|---|---|---|---|
| 9,949,044 | B1 * | 4/2018 | Choi | H04R 25/552 |
| 2004/0176025 | A1 * | 9/2004 | Holm | H04H 60/05 455/3.06 |

(Continued)

FOREIGN PATENT DOCUMENTS

| | | | | | |
|---|---|---|---|---|---|
| EP | 1615468 | A1 * | 1/2006 | | G10H 1/0066 |
| GB | 2591522 | A * | 8/2021 | | G09B 15/003 |

(Continued)

OTHER PUBLICATIONS

Ibbotson, "Copyright IBM Corporation 2004 Trademarks Using publish/subscribe messaging to distribute MIDI commands," Dec. 15, 2004 (Dec. 15, 2004), Retrieved from the Internet: URL:https://www.ibm.com/developerworks/websphere/library/techarticles/0412_ibbotson/0412_ibbotson-pdf.pdf, pp. 6-10.

(Continued)

*Primary Examiner* — Jeffrey Donels
(74) *Attorney, Agent, or Firm* — Barnes & Thornburg LLP

(57) ABSTRACT

A wireless headset configured to process music interface protocol (e.g., the Musical Instrument Digital Interface (MIDI) protocol) received wirelessly (e.g., via a Bluetooth™ connection or an Internet connection) by a source device is described herein. The wireless headset includes a first and second headset speaker and a wireless transceiver unit to receive a stream of data over a wireless connection. The wireless transceiver unit includes a sound processing logic unit that converts the stream of data to a stream of data associated with a music interface protocol outputs audio corresponding to the converted stream of data to the first and second headset speakers.

20 Claims, 3 Drawing Sheets

(58) Field of Classification Search
CPC .. H04R 1/1091; H04R 2420/07; H04R 5/033; H04R 3/00
See application file for complete search history.

(56) References Cited

U.S. PATENT DOCUMENTS

| | | | | |
|---|---|---|---|---|
| 2004/0209629 | A1* | 10/2004 | Virolainen | G10H 1/0066 455/414.1 |
| 2005/0286546 | A1* | 12/2005 | Bassoli | H04W 88/04 370/503 |
| 2007/0233905 | A1 | 10/2007 | Hatano et al. | |
| 2008/0175207 | A1* | 7/2008 | Lee | H04L 65/61 370/337 |
| 2010/0260363 | A1 | 10/2010 | Gatt et al. | |
| 2014/0219467 | A1 | 8/2014 | Kurtz | |
| 2015/0371619 | A1 | 12/2015 | Uehara | |
| 2016/0357251 | A1* | 12/2016 | O'Neil | G10H 1/0083 |
| 2018/0233119 | A1* | 8/2018 | Patti | H04L 65/80 |
| 2018/0276970 | A1 | 9/2018 | Savolainen | |
| 2018/0329671 | A1* | 11/2018 | Einziger | G06F 3/00 |
| 2021/0191508 | A1* | 6/2021 | O'Neil | G10H 1/0066 |
| 2021/0377647 | A1* | 12/2021 | Reece | G06F 3/162 |

FOREIGN PATENT DOCUMENTS

| | | | |
|---|---|---|---|
| JP | 2014-182277 | 9/2014 | |
| JP | 2016-008974 | 1/2016 | |
| JP | 2017-111614 | 6/2017 | |
| WO | WO-0112059 A1 * | 2/2001 | A61B 5/162 |

OTHER PUBLICATIONS

Maekawa et al., "A wireless, networked musical environment consisting of wearable MIDI instruments," 10th International Conference on Telecommunications, 2003. ICT 2003., Papeete, France, 2003, pp. 1731-1734 vol. 2.

Search Report & Written Opinion issued in Int'l Appl. No. PCT/US2020/056829 (2020).

English translation of Office Action issued in JP 2022-523664 (Jun. 26, 2024).

Office Action issued in IN 202217029152 (Sep. 6, 2024).

* cited by examiner

WIRELESS MIDI HEADSET

CROSS-REFERENCE TO RELATED APPLICATIONS

The present application claims the benefit of U.S. Provisional Patent Application No. 62/924,872, filed Oct. 23, 2019, which is incorporated herein by reference in its entirety.

FIELD

The present disclosure relates to a headset device that receives Music Instrument Digital Interface (MIDI) data and/or audio via a wireless protocol for audio output.

BACKGROUND

Many electronic musical instruments, such as keyboards, synthesizers, and drum machines implement the MIDI standard. When an individual plays a MIDI instrument, the instrument (e.g., via MIDI controller thereon) converts actions by the individual to MIDI data. More particularly, the instrument generates MIDI data that specifies instructions for music (e.g., notation, pitch, vibrato, and other characteristics). A device such as a sound module or sequencer, configured within the MIDI instrument or externally, may then interpret the MIDI data to play back sound representing the individual's playing of the instrument.

Generally, MIDI instruments may be configured to output audio to an analog headset device connected thereon (or to a speaker connected with the MIDI instrument) via a cable or a radio frequency (RF) transmitter and receiver combination. An individual may desire to wear a wireless headset while practicing on a MIDI instrument for a variety of reasons (e.g., to practice the instrument in silence relative other individuals). However, wireless headsets generally have several drawbacks. One such drawback includes the cost and inconvenience of using a RF transmitter and receiver pair. In such a case, if a wireless protocol such as Bluetooth™ is used, the wireless headset may encounter latency between the playing of the instrument, such as a pushing of a key, to the transmission of the corresponding MIDI data to the headset for audio output to speakers of the headset. As a result, the individual may hear a given output relatively later to when the corresponding key was pushed, which can affect the overall experience for the individual playing the MIDI instrument. For example, a relatively high latency may affect when the individual hears a corresponding output from the MIDI instrument and consequently affect performance aspects, such as timing.

SUMMARY

An embodiment presented herein discloses a wireless headset configured with a MIDI sound processor to output MIDI data in relative real-time. The wireless headset device includes a first and a second headset speaker. The wireless headset device also includes a wireless transceiver unit having a sound processing logic unit. The wireless transceiver is to receive, over a wireless connection with a source device, a stream of data. The wireless transceiver is also to convert, by the sound processing logic unit, the stream of data to a stream of data associated with a music interface protocol. The wireless transceiver is also to output, by the sound processing logic unit, audio corresponding to the converted stream of data to the first and second headset speakers.

Another embodiment presented herein discloses a method. The method generally includes receiving, by a wireless headset over a wireless connection with a source device, a stream of data. The wireless headset comprises first and second headset speakers. The method also includes converting, by the wireless headset, the stream of data to a stream of data associated with a music interface protocol. The method also includes outputting, by the wireless headset, audio corresponding to the converted stream of data to the first and second headset speakers.

Yet another embodiment presented herein discloses a wireless headset having means for receiving, over a wireless connection with a source device, a stream of data. The wireless headset further includes means for converting the stream of data to a stream of data associated with a music interface protocol. The wireless headset also includes means for outputting audio corresponding to the converted stream of data to the first and second headset speakers.

DETAILED DESCRIPTION

Embodiments presented herein disclose a wireless headset having a sound processor configured to receive data formatted under a music interface protocol such as the Music Instrument Digital Interface (MIDI) from a source, such as a MIDI instrument (e.g., a MIDI keyboard, synthesizer, drum kit, etc.). The data may be produced as a result of an individual playing the MIDI instrument. The source may transmit the MIDI data via a wireless communication protocol, such as the Bluetooth™ protocol, to the wireless headset. The sound processor on the wireless headset converts the MIDI data to audio for output on the headset. Advantageously, rather than process the MIDI data via the MIDI instrument for output on the headset, doing so on the headset significantly reduces latency between the individual's playing of the MIDI instrument and the corresponding sound being output on the wireless headset.

Further advantageously, sound processing of MIDI data via a wireless headset enables the wireless headset to process and output MIDI data received from a variety of sources and communication protocols. For example, in an embodiment, the wireless headset can receive MIDI data (e.g., timestamped MIDI packet data) from a device over a network, such as the Internet, using publish-subscribe messaging protocols. Thereafter, the wireless headset may process and output audio data corresponding to the received MIDI data in relative real-time to the source device transmitting the MIDI data over the network.

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Figure 1:
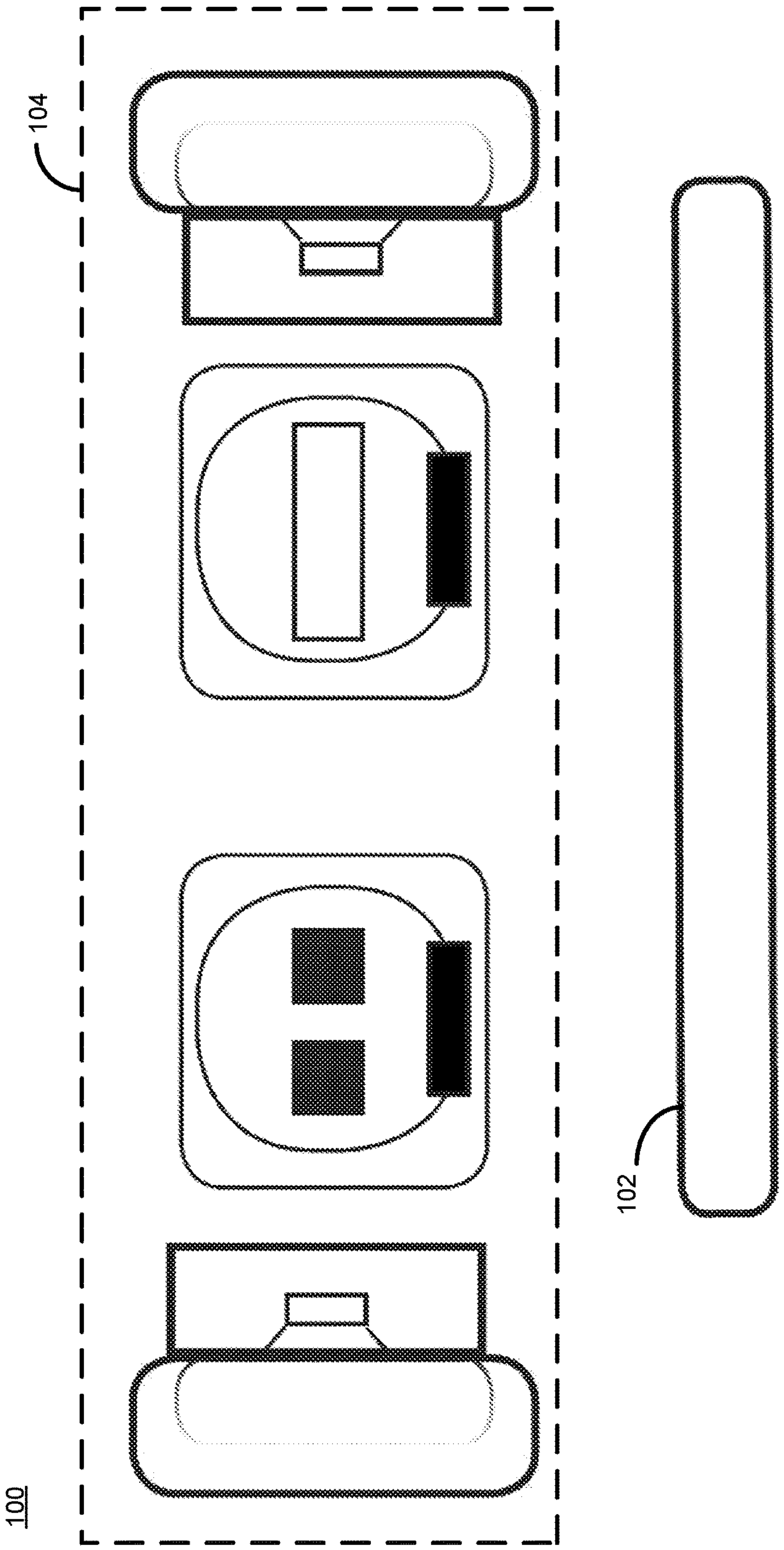
FIG. 1 illustrates a perspective view of at least one embodiment of an example wireless headset configured with a MIDI sound engine to output MIDI data relatively in real-time.

FIG. 1 illustrates an embodiment of a wireless headset 100 configured to receive music instrument protocol (e.g., MIDI protocol) data and process the data for audio output through the headset 100. Illustratively, the wireless headset 100 includes headset speakers 104 and a wireless transceiver unit 102.

In an embodiment, the headset speakers 104 may be representative of traditional headphone speakers that an individual may wear over each ear. In another embodiment, each headset speaker 104 may be embodied as an earbud that an individual can insert in the ear. Further, in some embodiments, the headset speakers 104 may be physically connected with one another via a band, wire, or other material. In other embodiments, each headset speaker 104 may be physically separated from one another. Also, in some embodiments, one or both of the headset speakers 104 may be physically connected with the wireless transceiver unit 104 via a band, wire, or other material. In other embodiments, the wireless transceiver unit may be situated on or within one of the headset speakers 104.

In one embodiment, one of the headset speakers 104 may be designated as a master speaker relative to the other headset speaker 104. In such a case, the other headset speaker 104 is designated as a slave speaker. The headset speaker 104 designated as master may receive digital audio data from a source (e.g., the wireless transceiver unit 102) and transmit the digital audio data to the slave device such that both speakers 104 play the digital audio synchronously.

The illustrative wireless transceiver unit 102 may be embodied as any device or circuitry (e.g., a microcontroller, processor, or other processing or controlling circuit) capable of communicating with an external device (e.g., an electronic instrument configured with the MIDI protocol) over a wireless protocol, such as the Bluetooth™ wireless protocol. For instance, the wireless transceiver unit 102 may connect with a MIDI instrument, such as an electronic keyboard configured with wireless capabilities, using the Bluetooth™ protocol. In the event that the MIDI instrument does not have built-in Bluetooth™ capability, a Bluetooth™ adapter may attach to the MIDI instrument (e.g., at the MIDI port of the instrument) to connect and communicate with the wireless transceiver unit 102 via Bluetooth™ techniques. In addition, the wireless transceiver unit 102 may include other wireless communication device or circuitry used to establish communications over a network, such as the Internet. Doing so allows the wireless transceiver unit 102 to receive data over the network, such as by a MIDI source instrument connected to the Internet or by a server transmitting MIDI data over the Internet. In other embodiments, the wireless headset 100 may include additional network communication components for establishing and communicating over the network.

In addition, as further described herein, the wireless transceiver unit 102 also includes sound processor circuitry to process received data and send underlying audio output to be played via the headset speakers 104. More particularly, the wireless transceiver unit 102 is configured to receive a raw data stream from a device (e.g., a MIDI instrument or a computing device streaming MIDI data), in which the underlying data stream comprises MIDI data. The sound processor circuitry converts the data stream to MIDI data and reads the MIDI data to output a corresponding audio from the headset speakers 104. By using a wireless protocol, such as the Bluetooth™ protocol, to transmit MIDI data to the headset for sound processing, the wireless headset 100 may output audio at a relatively lower latency than in the case in which the MIDI data is processed at the MIDI instrument and sent to an external audio output device. The wireless transceiver unit 102 may also include network communication circuitry to connect the wireless headset over a network, such as the Internet, to enable the wireless headset to receive a MIDI data stream wirelessly over the network.

Note, the wireless headset 100 may also include other components not shown in FIG. 1. For example, the wireless headset 100 may include a display panel, such as on one of the headset speakers 104, the wireless transceiver unit 102, or as a separate physical component. The display panel may provide information to a user, such as a remaining battery life on the wireless headset 100, whether the wireless headset 100 is connected to any devices, the types of devices that the wireless headset 100 is connected with, and so on. Further, the wireless headset 100 may also include buttons and corresponding circuitry for each button that map to features of the wireless headset 100, such as on/off functionality, pairing and connectivity functionality, volume up/down functionality, record audio functionality, upload audio functionality, and the like.

Figure 2:
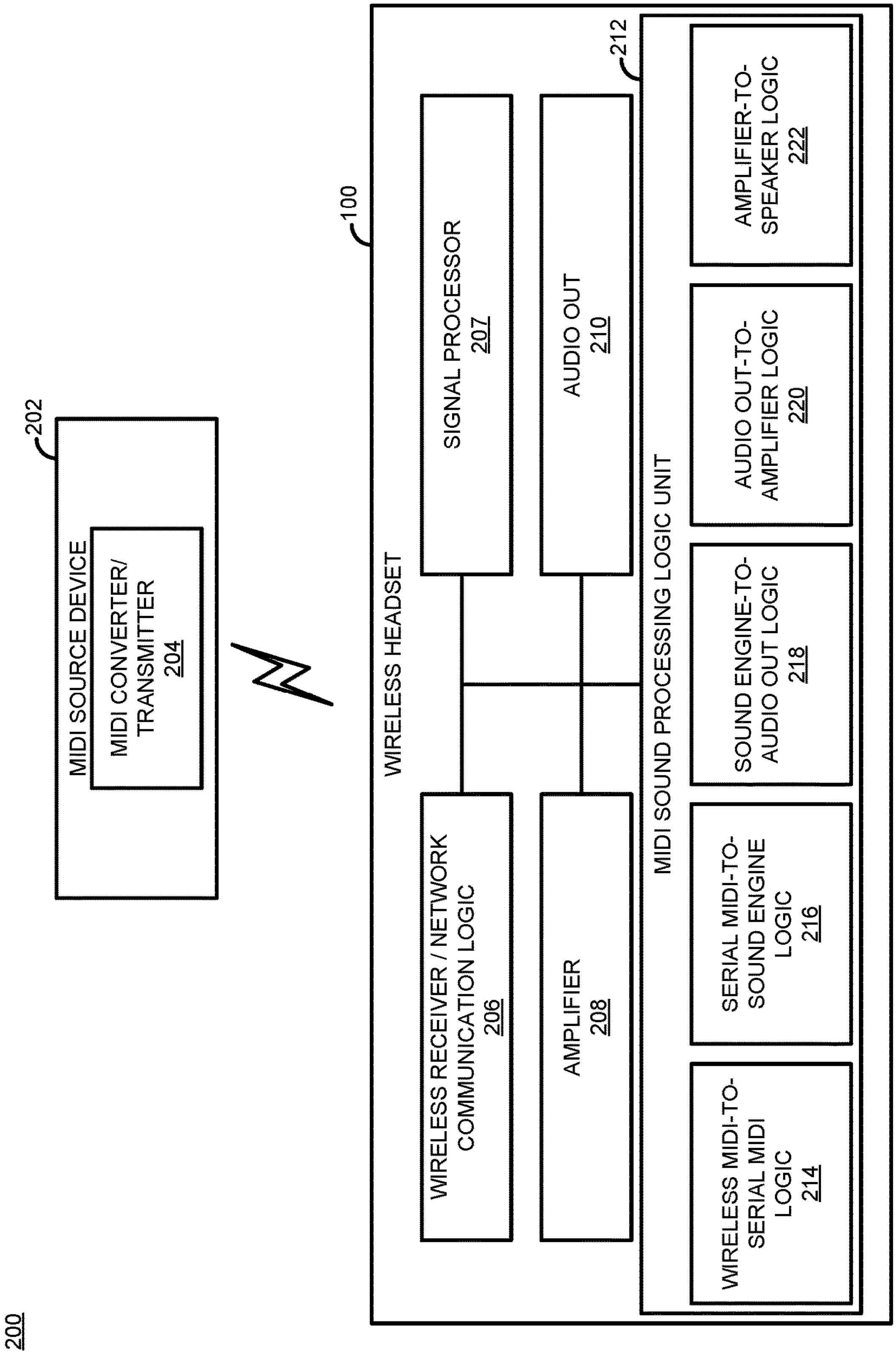
FIG. 2 illustrates at least one embodiment of an example performance environment in which the wireless headset of FIG. 1 may operate.

FIG. 2 illustrates an example environment 200 in which the wireless headset 100 may operate including a description of components within the wireless headset 100. As shown, the environment 200 includes a MIDI source device 202 and the wireless headset 100.

In an embodiment, the MIDI source device 202 may be embodied as any device or software (e.g., a virtual machine instance) capable of generating and/or transmitting MIDI data. For example, the MIDI source device 202 may be a desktop computer, an electronic music instrument (e.g., a digital or acoustic keyboard, synthesizer, drum kit, etc.), and the like. In an embodiment, the MIDI source device 202 may include a MIDI converter/transmitter 204, which may be embodied as any device or circuitry used to convert input data generated from the MIDI source device to data for wireless transmission and transmit the MIDI data wirelessly over a network.

For example, the MIDI source device 202 may generate MIDI data from input by an individual (e.g., the individual pushing a key on the digital keyboard, the individual performing a playback command on MIDI player software executing on the MIDI source device 202, etc.). The generated MIDI data may comprise an event message that includes a corresponding note, notation, pitch, velocity, vibrato, panning, tempo, and the like. In communication with the wireless headset 100, the MIDI converter/transmitter 204 may convert this MIDI data to data for wireless transmission (e.g., via the Bluetooth™ protocol) and transmit the converted data to the wireless headset 100. Note, although FIG. 2 depicts the MIDI converter/transmitter 204 are one component, in practice, the MIDI converter/transmitter 204 may be embodied as separate components, such as a separate MIDI converter circuitry and a wireless transmitter circuitry.

As stated, the MIDI source device 202 may also be a computing device. The computing device may be capable of streaming MIDI data over a network (e.g., the Internet) to multiple wireless headsets over the network. Doing so enables multiple headsets to playback MIDI data relatively contemporaneously from a single source. For example, to do so, the computing device may establish communications with the wireless headset (e.g., the wireless transceiver unit 102 thereof) using a publish-subscribe protocol, such as the MQTT (Message Queuing Telemetry Transport) protocol over a message broker, such as the Mosquitto MQTT broker. The MIDI source device 202 may send the MIDI data over the TCP/IP protocol client port using publish-subscribe techniques. The MIDI source device 202 may also send or receive MIDI data using a web client via the broker. The MIDI data sent over the network may comprise timestamped MIDI packet data. The wireless transceiver unit 102 of the wireless headset 100 may subscribe to a MQTT topic associated with the MIDI data. Once subscribed, the wireless headset 100 receives the packets (e.g., via the wireless transceiver unit 102), processes the packets, and plays back the MIDI data.

As shown, wireless headset 100 further includes a wireless receiver 206, a signal processor 207, an amplifier 208, an audio out 210, and a MIDI sound processing logic unit 212. In an embodiment, the wireless receiver 206 may be embodied as any device or circuitry within the wireless headset 100 (e.g., within the wireless transceiver 102) that is configured to receive wireless transmissions from external devices, such as the MIDI source device 202. For example, the wireless receiver 206 may receive wireless transmissions of input data converted from MIDI data from the MIDI converter/transmitter 204. The signal processor 207 may be embodied as any device or circuitry to evaluate data received at the wireless receiver 206, e.g., to determine whether the received data includes any MIDI data. If so, the signal process 207 may send the data for processing by the MIDI sound processing logic unit 212.

The MIDI sound processing logic unit 212 may be embodied as any device, software, firmware, or circuitry configured to convert wireless transmissions received from the MIDI source device 202 to MIDI data to be output as audio to the wireless headset 100 (e.g., via the headset speakers 104). For example, in an embodiment, the MIDI sound processing logic unit 212 includes a wireless MIDI-to-serial MIDI logic 214, a serial MIDI-to-sound engine logic 216, a sound engine-to-audio out logic 218, an audio out-to-amplifier logic 220, and an amplifier-to-speaker logic 222. In an embodiment, the MIDI sound processing logic unit 212 may also include circuitry or logic to synchronize MIDI data to digital audio. Each component may be embodied as any combination of device, firmware, software, or circuitry within the MIDI sound processing logic unit 212. Although each of these components are depicted separate of another and within the MIDI sound processing logic unit 212, one of skill in the art will recognize that each of the components may be embodied in the wireless headset 100 in various configurations. For example, some components may be combined into a circuitry (e.g., such as the audio out-to-amplifier logic 220 and the amplifier-to-speaker logic 222).

The wireless MIDI-to-serial MIDI logic 214 is configured to evaluate wireless MIDI data processed by the signal processor 207. Further, the wireless MIDI-to-serial MIDI logic 214 is configured to convert the wireless MIDI data to serial MIDI data that can be read for playback by a sound engine in the wireless headset 100 (not shown). The serial MIDI-to-sound engine logic 216 converts the serial MIDI data to data readable by the sound engine such that event messages in the MIDI data are interpretable by the sound engine. The sound engine-to-audio out logic 218 processes the MIDI data for production of a given sound (e.g., a determination of which channels to play the sound, the volume of the sound, the velocity of the sound, etc.) on the audio out unit 210 of the wireless headset 100, which is configured in an embodiment to send the sound (and other audio output) to the amplifier 220. To do so, the audio-out-to-amplifier logic 220 may send the audio output to the amplifier 208 from the audio out 210. The amplifier-to-speaker logic 222 may transduce the audio for output on each of the headset speakers 104.

Figure 3:
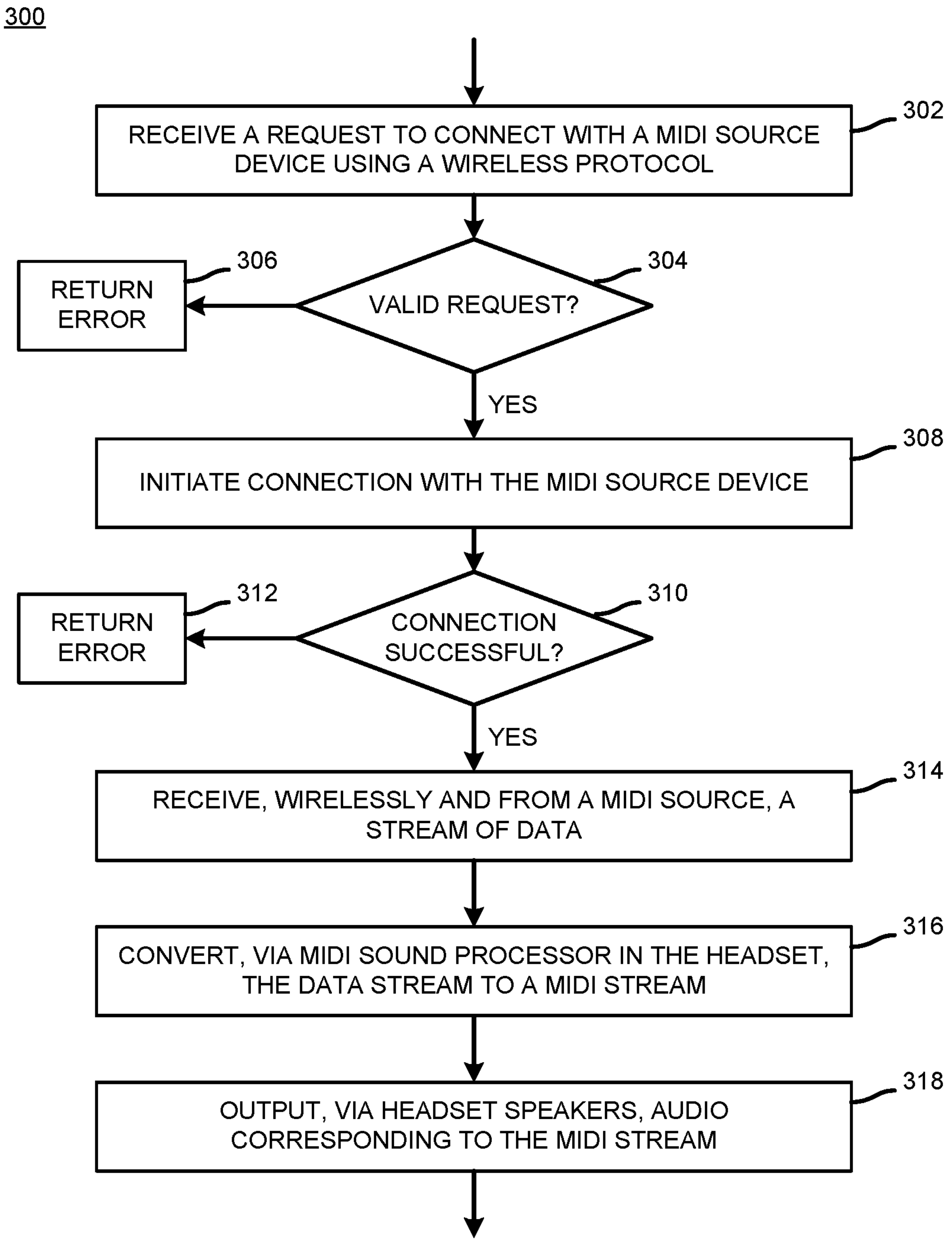
FIG. 3 illustrates a flow diagram of at least one embodiment of a method for operating the wireless headset of FIG. 1.

Referring now to FIG. 3, a method 300 for operation of the wireless headset 100 is now described. As shown, the method 300 begins in block 302, in which the wireless headset 100 receives a request to connect with a MIDI source device (e.g., the MIDI source device 202) using a wireless protocol. For example, a user of the wireless headset 100 may initiate, e.g., via a press of a button on the wireless headset 100, a Bluetooth™ connection and pairing sequence with an electronic keyboard configured with the MIDI protocol. The wireless headset 100 may, via logic executing therein, initiate the connection based on the request. In block 304, the wireless headset 100 determines whether the request is valid. For example, the wireless headset 100 may determine whether any Bluetooth™-enabled device is in network range and further determine whether the device is a device that supports the MIDI protocol. If the request is not valid, in block 306, the wireless headset 100 may return an error (e.g., an audio message indicating that the connection was not successful output via the headset speakers 104).

However, if the request is valid and the wireless headset 100 detects a compatible MIDI source device, in block 308, the wireless headset 100 may initiate the connection with the MIDI source device using wireless protocol (e.g., Bluetooth™) techniques. In block 310, the wireless headset 100 determines whether the connection is successful. If not, then in block 312, the wireless headset 312 may return an error (e.g., an audio message indicating that the connection was not successful output via the headset speakers 104).

Of course, blocks 302-312 may be adapted for a wireless connection to a network, such as the Internet. For instance, the wireless headset 100 may connect to the Internet, e.g., via a wireless access point (e.g., a network router) and initiate the flow of the aforementioned blocks with a source device also connected to the Internet. In an embodiment, the source device may communicate with the wireless headset 100 using a publish-subscribe protocol, such as MQTT. The device may establish a MQTT topic for the MIDI data, and the wireless headset 100 subscribes to the topic. The source device may transmit MIDI data packets including timestamps therein. The timestamps may be generated based on a monotonic clock rounded to a given unit, such as the nearest microsecond. The wireless headset 100 may record a monotonic clock distinct to the headset 100.

While connected, the wireless headset 100 is capable of processing MIDI data for playback, e.g., in relative real-time and minimal latency. For example, in the event that the connected MIDI source device is an electronic keyboard, an individual may push a key thereon. In response, the MIDI source device may generate MIDI data and send the MIDI data to the wireless headset 100 wirelessly through the connection as a raw stream of data. The MIDI data may also be contemporaneously transmitted by the MIDI source device to other connected devices, such as a portable device that captures MIDI data and automatically uploads the data to a cloud provider network.

In block 314, the wireless headset 100 receives the stream of data from the MIDI source device via the wireless connection. In block 316, the wireless headset 100 converts, via the MIDI sound processor logic unit therein, the raw data stream to MIDI data. Once converted, in block 318, the wireless headset 100 outputs, via the headset speakers 104, the corresponding audio from the MIDI data. In the event that the wireless headset is 100 is connected to a source device over a network, when the wireless headset 100 receives a packet of the MIDI data stream, the wireless headset 100 may compare the monotonic clock of the wireless headset 100 with the timestamp in the received packet. The wireless headset 100 may use the determined difference to build a playback buffer array, e.g., by converting a remote playback time to a local time and adding a specified delay. The wireless headset 100 may control playback using a timer loop with the buffer array. Further, in the event that the wireless headset 100 receives MIDI data corresponding to notes received too late to play may be removed from the queue. Thereafter, the wireless headset 100 may refresh the playback queue using the next underlying note received as a new timing base note. The difference between remote and local monotonic clocks is recorded for each note. Further still, notes having a delay significantly separated from the difference may increase a counter. After a specified threshold is exceeded, the wireless headset 100 may shift the delay in specified intervals (e.g., 1 millisecond intervals) until a number of the notes are within a specified range of difference.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration only, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media which may be read and executed by one or more processors. A machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided in sub-modules, sub-processes or other units of computer code or data as may be required by a particular design or implementation of the computing device.

In the drawings, specific arrangements or orderings of elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships, or associations between elements may be simplified or not shown in the drawings so as not to obscure the disclosure.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

Additional examples of the wireless headset and techniques for operating the same are provided in the attached appendices.

While the foregoing is directed to embodiments of the present disclosure, other and further embodiments of the disclosure may be devised without departing from the basic scope thereof, and the scope thereof is determined by the claims that follow.

What is claimed is:

1. A wireless headset device comprising:

a first and a second headset speaker, the first headset speaker being designated as a master speaker and the second headset speaker being designated as a slave speaker;

a monotonic clock;

a wireless transceiver unit comprising a sound processing logic unit, wherein the wireless transceiver is to:

receive, over a wireless connection with a source device, a stream of musical performance data comprising one or more network packets, each packet including a timestamp and event message, wherein the stream of musical performance data is associated with a wireless music interface protocol and wherein the event message comprises at least a musical note;

for each network packet, compare the monotonic clock with the timestamp;

convert, by the sound processing logic unit, the stream of real-time musical performance data from the wireless music interface protocol to a serial Musical Instrument Digital Interface (MIDI) protocol, wherein the conversion comprises building a playback buffer array based on the comparison of the monotonic clock with the timestamp for each network packet; and output, by the sound processing logic unit and according to the playback buffer array, audio corresponding to the converted stream of real-time musical performance data to the first headset speaker, wherein the first headset speaker transmits the audio to the second headset speaker.

2. The wireless headset device of claim 1, wherein the stream of real-time musical performance data associated with the wireless music interface protocol comprises a stream of real-time musical performance data associated with the MIDI protocol.

3. The wireless headset device of claim 1, wherein the wireless connection comprises a Bluetooth™ connection.

4. The wireless headset device of claim 1, wherein the wireless connection comprises an Internet connection.

5. The wireless headset device of claim 4, wherein the wireless headset communicates with the source device over the Internet connection using a publish-subscribe protocol.

6. The wireless headset device of claim 5, wherein the wireless headset communicates with the source device over the Internet connection using a Message Queuing Telemetry Transport (MQTT) protocol.

7. The wireless headset device of claim 1, further comprising a plurality of buttons and respective circuitry mapping to one or more functionalities thereof.

8. A method comprising:

receiving, by a wireless headset over a wireless connection with a source device, a stream of real-time musical performance data comprising one or more network packets, each packet including a timestamp and event message, wherein the wireless headset comprises first and second headset speakers, the first headset speaker being designated as a master speaker and the second headset speaker being designated as a slave speaker, wherein the stream of real-time musical performance data is associated with a wireless music interface protocol and wherein the event message comprises at least a musical note;

for each network packet, comparing a monotonic clock of the wireless headset with the timestamp;

converting, by the wireless headset, the stream of real-time musical performance data from the wireless music interface protocol to a serial Musical Instrument Digital Interface (MIDI) protocol, wherein the conversion comprises building a playback buffer array based on the comparison of the monotonic clock with the timestamp for each network packet; and outputting, by the wireless headset and according to the playback buffer array, audio corresponding to the converted stream of real-time musical performance data to the first headset speaker transmits the audio to the second headset speaker.

9. The method of claim 8, wherein the stream of real-time musical performance data associated with the music interface protocol comprises a stream of real-time musical performance data associated with the MIDI protocol.

10. The method of claim 8, wherein the wireless connection comprises a Bluetooth™ connection.

11. The method of claim 8, wherein the wireless connection comprises an Internet connection.

12. The method of claim 11, wherein the source device is connected with the wireless headset via a publish-subscribe protocol.

13. The method of claim 12, wherein the source device is connected with the wireless headset via a Message Queuing Telemetry Transport (MQTT) protocol.

14. The method of claim 8, further comprising a plurality of buttons and respective circuitry mapping to one or more functionalities thereof.

15. A wireless headset device comprising:

a first headset speaker designated as a master speaker;

a second headset speaker designated as a slave speaker means for receiving, over a wireless connection with a source device, a stream of real-time musical performance data comprising one or more network packets, each packet including a timestamp and event message, wherein the stream of real-time musical performance data is associated with a wireless music interface protocol and wherein the event message comprises at least a musical note;

means for comparing, for each network packet, a monotonic clock of the wireless headset device with the timestamp;

means for converting the stream of real-time musical performance data from the wireless music interface protocol to a serial Musical Instrument Digital Interface (MIDI) protocol, wherein the means for converting comprises means for building a playback buffer array based on the comparison of the monotonic clock with the timestamp for each network packet; and means for outputting, according to the playback buffer array, audio corresponding to the converted stream of real-time musical performance data to the first headset speaker, wherein the first headset speaker transmits the audio to the second headset speaker.

16. The wireless headset device of claim 15, wherein the stream of real-time musical performance data associated with the music interface protocol comprises a stream of real-time musical performance data associated with the MIDI protocol.

17. The wireless headset device of claim 15, wherein the wireless connection comprises a Bluetooth™ connection.

18. The wireless headset device of claim 15, wherein the wireless connection comprises an Internet connection.

19. The wireless headset device of claim 18, wherein the source device is connected with the wireless headset via a Message Queuing Telemetry Transport (MQTT) protocol.

20. The wireless headset device of claim 15, further comprising a plurality of buttons and respective circuitry mapping to one or more functionalities thereof.

* * * * *